(12) United States Patent
Ting

(10) Patent No.: US 6,825,982 B1
(45) Date of Patent: Nov. 30, 2004

(54) STRONGLY-REFRACTIVE ONE-DIMENSIONAL PHOTONIC CRYSTAL PRISMS

(75) Inventor: David Z Ting, Arcadia, CA (US)

(73) Assignee: The United States of Americas as represented by the Administrator of the National Aeronautics and Space Administration, Washington, DC (US)

(*) Notice: Subject to any disclaimer, the term of this patent is extended or adjusted under 35 U.S.C. 154(b) by 110 days.

(21) Appl. No.: 10/185,829

(22) Filed: Jun. 27, 2002

(51) Int. Cl.[7] ................................................. G02B 1/10
(52) U.S. Cl. ...................... 359/580; 359/586; 359/587; 359/831
(58) Field of Search ............................... 359/580, 586, 359/587, 577, 837, 831

(56) References Cited

U.S. PATENT DOCUMENTS

| 6,188,819 B1 | 2/2001 | Kosaka et al. | |
|---|---|---|---|
| 2001/0012149 A1 | 8/2001 | Lin et al. | |
| 2002/0018298 A1 | 2/2002 | Miller et al. | |
| 2004/0008437 A1 * | 1/2004 | Kittaka et al. | ............... 359/883 |

OTHER PUBLICATIONS

Superprism Phenomena in Photonic Crystals: Toward Microscale Lightwave Circuits, Hideo Kosaka et al., Journal of Lightwave Technology, vol. 17, No. 11, Nov. 1999.
Photonic crystals for micro lightwave circuits using wavelength–dependent angular beam steering, Hideo Kosaka, et al., Applied Physics Letters, vol. 74, No. 10, Mar. 1999.

* cited by examiner

Primary Examiner—Fayez Assaf
(74) Attorney, Agent, or Firm—John H. Kusmiss

(57) ABSTRACT

One-dimensional (1D) photonic crystal prisms can separate a beam of polychromatic electromagnetic waves into constituent wavelength components and can utilize unconventional refraction properties for wavelength dispersion over significant portions of an entire photonic band rather than just near the band edges outside the photonic band gaps. Using a 1D photonic crystal simplifies the design and fabrication process and allows the use of larger feature sizes. The prism geometry broadens the useful wavelength range, enables better optical transmission, and exhibits angular dependence on wavelength with reduced non-linearity. The properties of the 1D plhotonic crystal prism can be tuned by varying design parameters such as incidence angle, exit surface angle, and layer widths. The 1D photonic crystal prism can be fabricated in a planar process, and can be used as optical integrated circuit elements.

21 Claims, 12 Drawing Sheets

STRONGLY-REFRACTIVE ONE-DIMENSIONAL PHOTONIC CRYSTAL PRISMS

The invention described hereunder was made in the performance of work under a NASA contract, and is subject to the provisions of Public Law 96-517 (35 U.S.C. 202) in which the Contractor has elected not to retain title.

BACKGROUND OF THE INVENTION

1. Field of the Invention

The present invention relates to the field of prisms, wavelength division multiplexers, and optical integrated circuits. More specifically, it relates to methods of dispersing a polychromatic electromagnetic wave into its constituent wavelength An components.

2. Description of Related Art

A photonic crystal is a periodic structure consisting typically of two dielectric materials with high dielectric contrast (e.g., semiconductor and air), and with geometrical feature sizes comparable to or smaller than light wavelengths of interest. As an engineered structure or artificially engineered material, a photonic crystal can exhibit optical properties not commonly found in natural substances. Extensive research has led to the discovery of several classes of photonic crystal structures for which the propagation of electromagnetic radiation is forbidden in certain frequency ranges (photonic band gaps, or PBGs). More recently, it has also been realized that electromagnetic radiation with frequency just outside the photonic band gaps can propagate in photonic crystals with characteristics that are quite different from those of ordinary optical materials. Recently, Kosaka and co-workers, T. Kawashima, A. Tomita, M. Notomi, T. Tamamura, T. Sato and S. Kawakami published an article titled "Superprism phenomena in photonic crystals: Toward microscale lightwave circuits", *Journal of Lightwave Technology*, 17 (11): 2032–2038 (1999). In the article, Kosaka showed that they had demonstrated a "superprism" phenomenon in a three-dimensional photonic crystal. They reported that two light beams, with slightly different wavelengths (0.99 $\mu$m and 1 $\mu$m), exhibited a 50° divergence inside the photonic crystal. The same pair of beams entering a conventional optical material at the same angle would diverge by less than 1° after incidence. This unusually large color-dispersion capability is called the superprism or ultra-refractive effect. The photonic crystal that was the subject of the demonstration is a complex three-dimensional (3D) structure consisting of, from bottom to top: (1) a silicon substrate, (2) a silicon dioxide buffer layer patterned with a hexagonal array of holes formed by electron-beam lithography, and (3) alternating layers of amorphous silicon and silicon dioxide sputtered on top of the patterned buffer layer. It is believed that. NEC, NTT, and the Tohoku University in Japan sponsored the work performed. It is believed that the Tohoku University made the devices tested using E-beam (electron-beam) lithography to form a hexagonal lattice pattern on a silicon dioxide buffer layer grown on top of a silicon substrate. That step was followed by the deposition of amorphous silicon and silicon dioxide in alternating layers. A typical structure consists of 20 or so pairs of silicon/silicon dioxide layers. The silicon/silicon dioxide layers follow the contour of the E-beam patterned buffer layer and form a three-dimensional structure. The many steps in the process suggest that the devices produced were made at high cost.

The unusual propagation characteristics of electromagnetic waves with frequency just outside the photonic band gaps (PBGs) have been analyzed by a number of researchers. Lin et al. "recognize the highly nonlinear dispersion of PBG materials near Brilluoin zone edges and utilize the dispersion to achieve strong prism action" ("Highly dispersive photonic band-gap prism," S. Y. Lin, V. M. Hietala, L. Wang and E. D. Jones, Optics Letters, 21(21), pp 1771–1773, 1996). Notomi performed theoretical analysis and demonstrated "that light propagation in strongly modulated two-dimensional (2D)/3D photonic crystals become refractionlike in the vicinity of photonic band gap." ("Theory of light propagation in strongly modulated photonic crystals: Refractionlike behavior in the vicinity of the photonic band gap," M. Notomi, Phys. Rev. B, 62(16), pp 10696–10705, 2000). Miller et al. stated that in "region just outside the main reflection region there is strong group velocity dispersions, causing different wavelength of light to travel at different angles through the dielectric stack." ("Method for dispersing light using multilayered structures," D. A. B. Miller et al., U.S. patent application Ser. No. 20020018298). Lin et al. found that "very strong dependence of dielectric constant, and hence index of refraction, on photon energy near the bandgap allows photonic crystals to be used to form highly dispersive prisms and other optical elements." (S. Y. Lin et al., U.S. patent application No. 20010012149). All of these works recognize the strong dispersion of electromagnetic waves with frequencyjust outside the photonic band gaps (PBGs).

SUMMARY OF THE INVENTION

The invention shows that strong wavelength dispersion, known as the superprism effect or ultra-refraction, can be found in one-dimensional (one-dimensional) photonic crystals for entire photonic bands rather than near the band edges only. In the lowest frequency photonic band, ultra-refraction occurs near the edge of the Brillouin zone. In higher photonic bands, where wavelengths are always comparable to or shorter than photonic crystal feature sizes, ultra-refraction can be found for the entire band, or a significant portion of the entire band, rather than just near the band edges Oust outside photonic band gaps). The use of full bands rather than only band edges broadens the ultra-refraction wavelength range considerably. The use of full bands is preferred, as transmission tends to diminish near the band edges just outside photonic band gaps where reflection occurs. The use of higher bands also allows the use of photonic crystals with larger feature sizes, thereby reducing fabrication requirements. In a prism-like geometry, electromagnetic waves dispersed by the one-dimensional photonic crystal exhibit angular dependence on wavelength which is much closer to being linear, making this effect much easier to use than the highly non-linear dispersions near the band gap. The properties of the ultra-refractive one-dimensional photonic crystal prism can be tuned by varying design parameters such as incidence angle, exit surface angle, and layer widths. The mathematical analysis of a one-dimensional photonic crystal is well understood, and therefore the design procedure is simple. In addition to the foregoing, a one-dimensional photonic crystal prism is easier to fabricate than a 2D or 3D photonic crystal prisms. For optical and infrared wavelengths, they can be made on semiconductor wafers (e.g., silicon or gallium arsenide), which also allows for the possibility of monolithic integration with other micro optical components. For applications to longer wavelengths (such as millimeter waves), one-dimensional photonic crystal prisms could be made by bonding pre-formed wafers together.

An important reason why we are able to exploit fill-band ultra-refraction in one-dimensional photonic crystals is that it is easy to design one-dimensional photonic crystals with simple band structures that monotonically vary with frequency and wave vector. In 2D and 3D photonic crystals, photonic band structure can be considerably more complicated, and can sometimes exhibit features such as crossings or anti-crossings, or a multiplicity of bands, which makes the exploitation of full-band ultra-refraction more difficult. However, appropriately engineered 2D/3D photonic crystals can exhibit full-band (or at least partial band, rather than band-edge only) ultra-refraction, albeit at a greater cost due to increased complexity.

DETAILED DESCRIPTION

Figure 1:
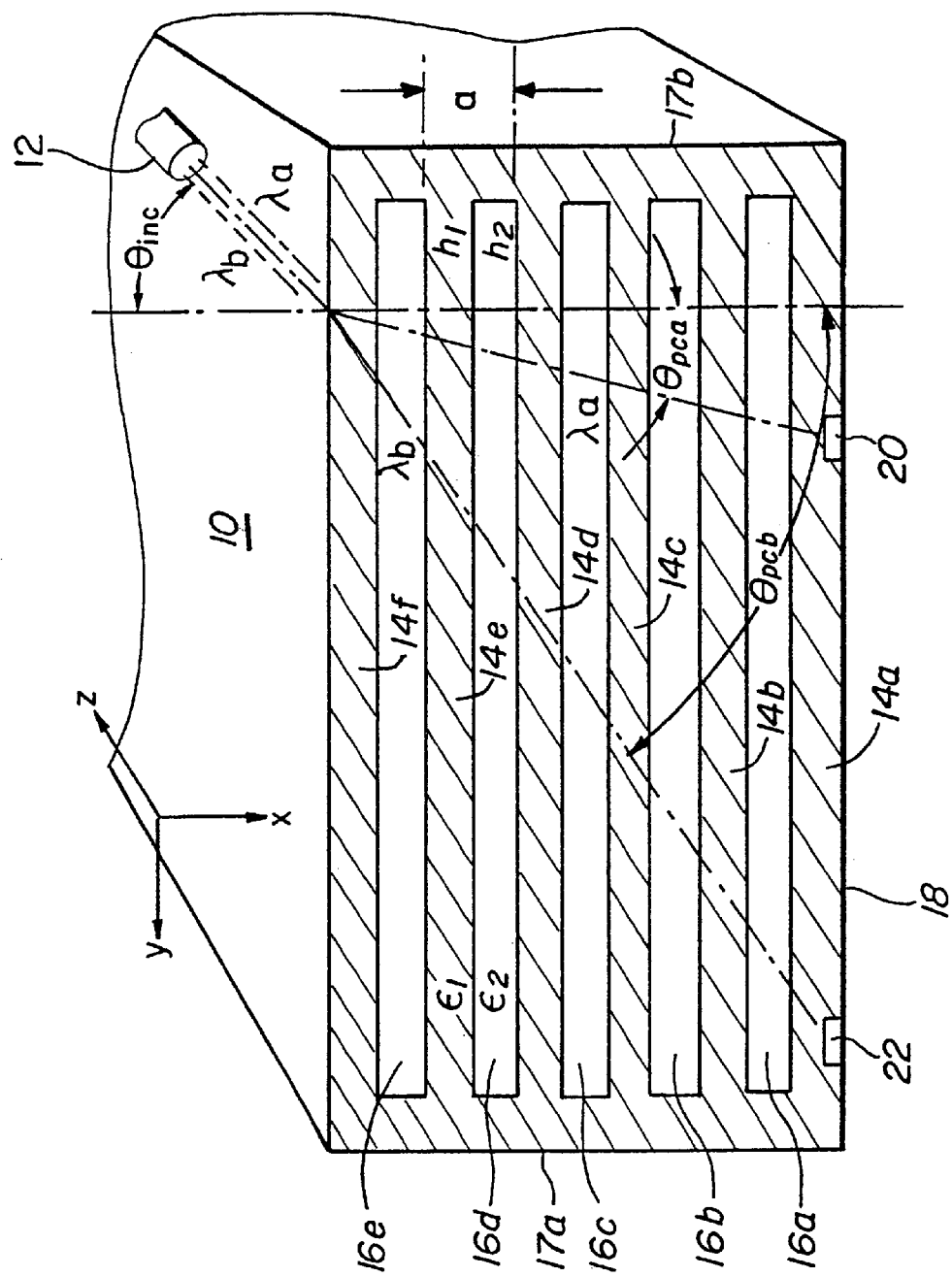
FIG. 1 is a schematic side sectional view of the one-dimensional Photonic Crystal.

The invention strongly refractive one-dimensional photonic crystal prism will now be discussed using the drawings of FIGS. 1–12. In FIG. 1, the photonic crystal 10 is shown receiving a first ray of light 12 from a first light source (not shown). The crystal superprism has a first vertically stacked parallel array of layers, 14a–14f, formed from a dielectric optical material, such as silicon or GaAs, having a first index of refraction, 1. In the embodiment of FIG. 1, the layers are spaced apart at uniform predetermined distances, such as distance "a" from each other. We identify "a" as the period of the one-dimensional photonic-crystal prism.

A second vertically stacked parallel array of layers 16a–16e are formed from a dielectric optical material or a void space and have a second index of refraction, 2. The second vertically stacked parallel array of layers 16a–16e are spaced apart at uniform predetermined distances from each other. The second vertically stacked parallel array is interleaved into, as a stack of cards, the first vertically stacked parallel array. Optional sidewalls 17a, 17b are shown, although they are not necessary if the multilayers are mechanically self-supporting, or supported at the back (not shown).

The layer widths of the first and second material within each period are $h_1$ and $h_2$, respectively. We note that $$h_1 + h_2 = a.$$

In principle, there could be more than two layers per (repeating) period. The analysis described here also applies to structures having more than two layers per period. However, since one of the principle objectives of the invention is ease of fabrication, the simpler structure with two layers per period is the preferred embodiment.

The light ray 12 in FIG. 1 is described to have two wavelength components, $\lambda_a$ and $\lambda_b$, each having a common angle of incidence Oinc and a respective angle of refraction $\theta_{pca}$, $\theta_{pcb}$. The rays split at the point of incidence, diverge and pass through the first and second arrays of layers 14a–14f and 16a–16e to exit the first and second vertically stacked parallel arrays at the bottom surface 18. The two rays exit at predetermined locations and are received on respective targets 20, 22. The targets 20, 22 are positioned and orientated to select predetermined spectra within the combined light ray 12 after refractive separation. The target array 20, 22 could be detectors or ports.

The second vertically stacked parallel array of layers 16a–16e, as shown in FIG. 1, is an array of void space layers, but other materials can be used as design choices. The second array of spaces might be filled with a gas such as air or if thermal conductivity is a consideration, xenon might be used. The index of refraction of the gas will be a factor in the selection of any material or gas.

ANALYSIS

To analyze superprism effects in a strongly refractive one-dimensional photonic crystal 10, consider the schematic geometry of FIG. 1 with a collimated light ray 12 striking the incident face of the one-dimensional photonic crystal, the ray having a first component of light with a wavelength of $\lambda_a$ and second component of light with a wavelength $\lambda_b$. The ray is depicted as having an angle of incidence of $\theta_{inc}$ and is shown as being coupled through a homogeneous medium (e.g., air) into the one-dimensional photonic crystal surface. After entry into the top surface, the light waves split and propagate at separate respective angles of refraction. The component of the ray with a wavelength of $\lambda_a$ propagates with an angle of refraction of $\theta_{pca}$, and the component of the light ray having wavelength $\lambda_b$ propagates with an angle of refraction of $\theta_{pca}$. To compute the relationship between OinC and a light ray having a predetermined wavelength $\lambda$ and an angle of refraction $\theta_{pc}$, we use the following procedure:

1. Specify the angular frequency of the ray $$\omega = 2\pi f$$

(where $f$ is the frequency of light ray) and the incidence angle $\theta_{inc}$ is measured in a homogeneous medium.

2. Using the relationships:

$$\epsilon_r \omega^2 = k_x^2 + k_y^2$$

and, find the wave vector in the incident medium. Here $\epsilon_r$ is the relative permittivity of the incident medium, and $k_x$ and $k_y$ are the components of the wave vector perpendicular and parallel, respectively, to the interface between the homogeneous medium and the photonic crystal. (Without lost of generality, we have let $k_z=0$), and 3. Compute a photonic crystal dispersion relationship $\omega(k)$, using a transfer matrix method, a standard technique commonly found in the literature, such as that described in F. Abeles, *Annales de Physique*, 5, 706, 1950. Here the angular frequency $\omega$ and the parallel component of the wave vector $k_y$ are the same as those in the incident homogeneous medium. The transfer matrix technique allows us to find the perpendicular component of the wave vector $k_x$ in the photonic crystal.

4. From the photonic crystal dispersion relationship, compute the group velocity $V_g(k)$ in the photonic crystal using.

$$V_g(k)=\nabla_k\omega(k)=(\partial\omega(k)/\partial k_x, \partial\omega(k)/\partial k_z).$$

5. The components of the group velocity gives us the angle of refraction, $\theta_{pc}$ in the one-dimensional photonic crystal where:

$$\theta_{pc=tan}{}^{-1}(v_{g,y}/v_{g,x}).$$

The proceeding procedure computes the angle of light propagation or angle of refraction $\theta_{pc}$ in the photonic crystal as a function of wavelength and the angle of incident $\theta_{inc}$.

Figure 2:
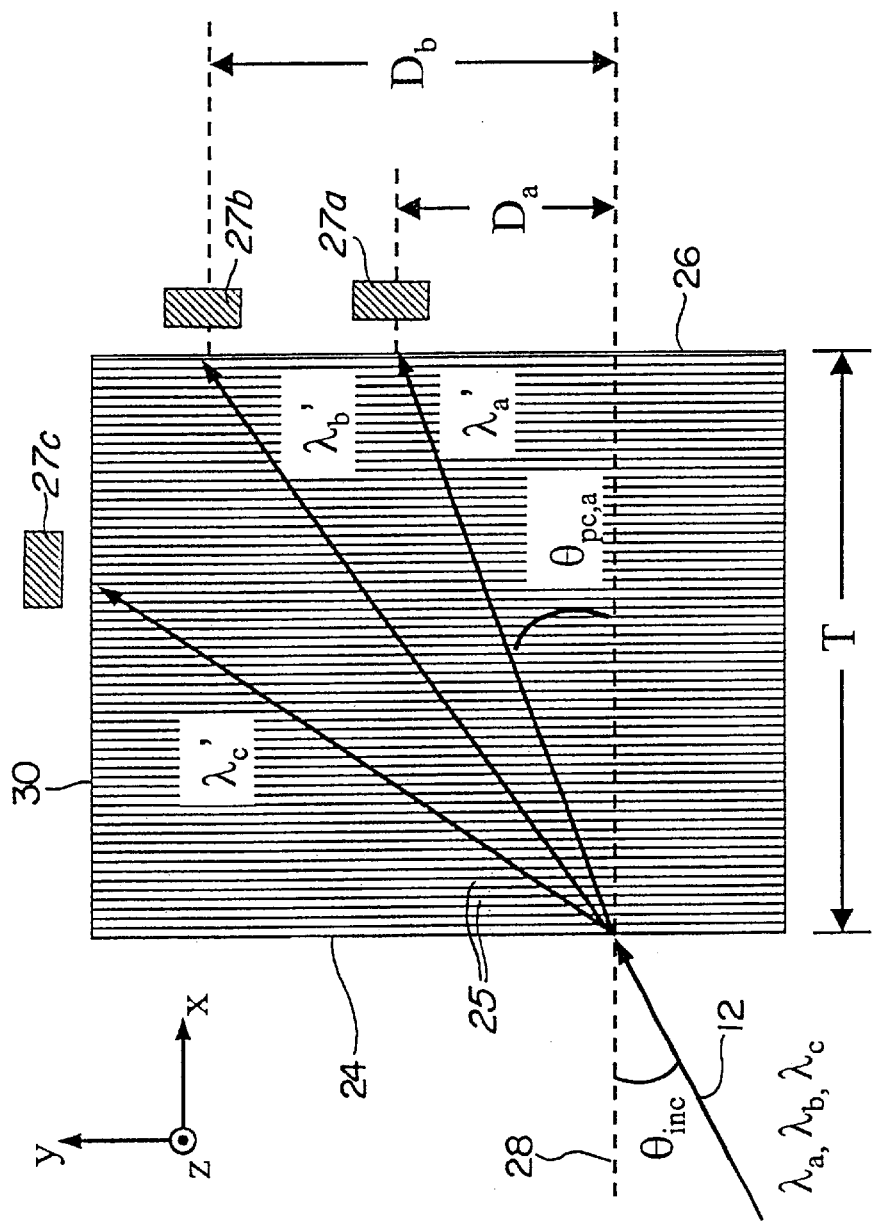
FIG. 2 schematically illustrates how a one-dimensional photonic crystal slab might be used to disperse light of different wavelengths.

FIG. 2 illustrates how a slab of one-dimensional photonic crystal is used to separate a polychromatic beam into different wavelength components. The incident and exit faces 24, 26 are parallel, and both surfaces are perpendicular to the principal axis 28 of the photonic crystal, which is perpendicular to its constituent layers. The principal axis 28 of the photonic crystal (as shown) is along the x-direction. The wavelength components $\lambda_a$, $\lambda_b$, $\lambda_c$ in the incident beam 12 are predetermined to be within an ultra-refractive range. The components of light of different wavelengths are shown to be dispersed into a wide range of propagation angles inside the photonic crystal. The figure illustrates that wavelength component $\theta_c$ is directed towards a different exit surface 30 of the photonic crystal, and is separated from $\theta_a$ and $\theta_b$ which are shown exiting exit surface 26. FIG. 2 also illustrates that wavelength components $\theta_a$ and $\theta_b$ are separated having different lateral (y direction) displacements $D_a$ and $D_b$ along exit surface 26. The wavelength rays for ka and kb are directed to targets 27a, 27b respectively, such as detectors or ports placed at suitable locations on or in the y direction close to the back surface. FIG. 2 shows that the lateral displacement of a ray is given by:

$$D=T\tan(\theta_{pc}),$$

where T is the total thickness of the photonic crystal slab.

Figure 5:
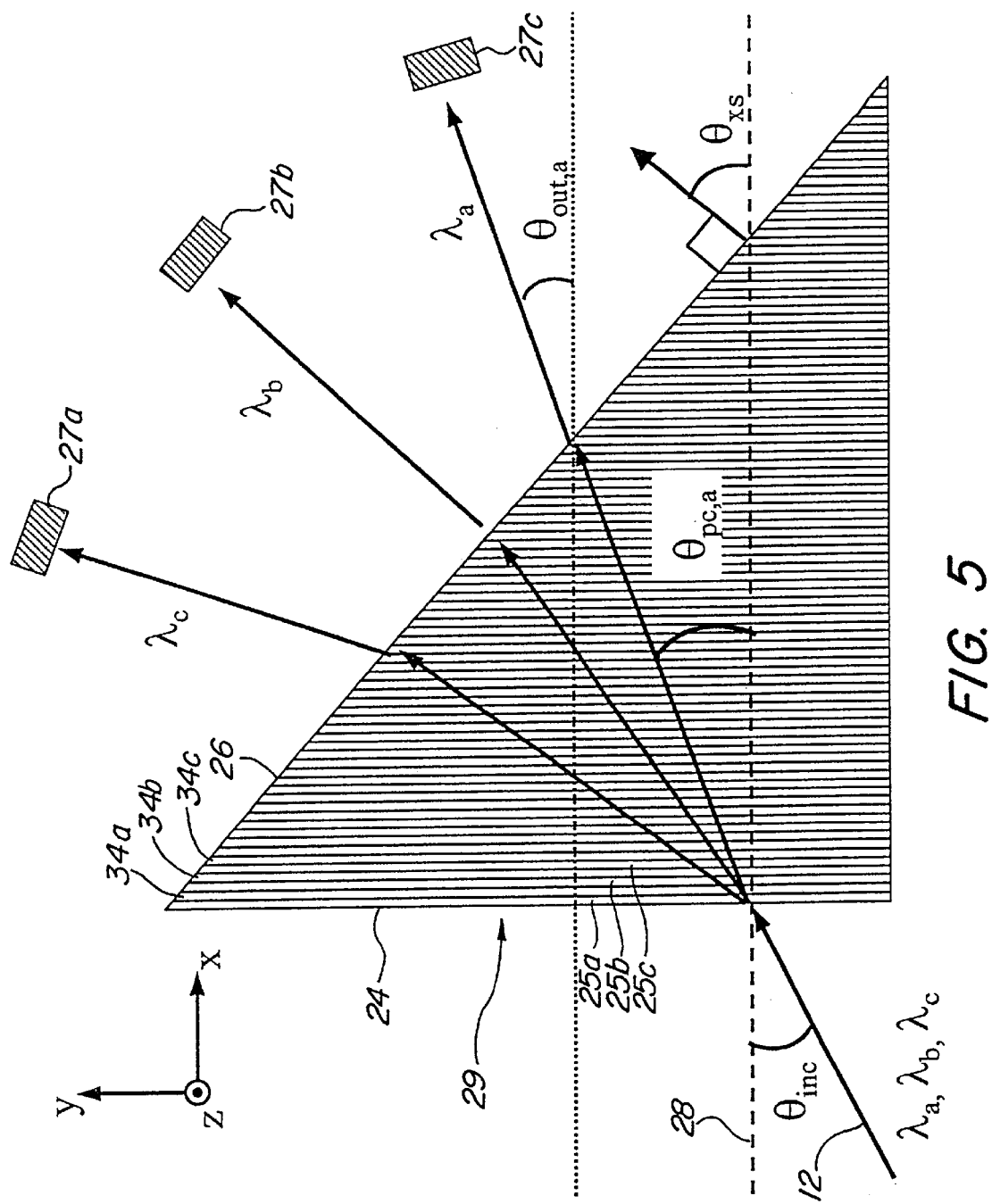
FIG. 5 schematically illustrates the strongly refractive one-dimensional photonic crystal prism with an angled exit surface used to disperse electromagnetic waves of different wavelengths to three remote targets.

FIGS. 2 and 5 show a photonic crystal in respective alternative embodiments responsive to the collimated light ray 12 from a light source (not shown). As above, the light source has at least two wavelengths and might be a broadband fiber source. The dark straight parallel lines represent a parallel array of dielectric plates. Each dielectric plate has parallel sides. The dielectric plates are periodically spaced at a distance such as distance "a" as shown in FIG. 1. The plates are made of a dielectric material such as silicon or GaAs. The plates extend normally and homogeneously from the substrate. As depicted, the array has at least an incident face 24 and an exit surface 26 normal to the substrate. The light source is shown coupled to the incident face in both figures.

In the embodiments of FIGS. 2, 5, 9 and 10, the light ray passes from the incident face 24 through the a parallel array of dielectric plates to exit the exit surface 26 and provide a spectrally spread image on target surfaces such as the surface of the detectors 27a, 27b, and 27c shown. Embodiments, such as those in FIGS. 2, 9 and 10 use dielectric plates and substrate material that is homogenous, or made from the same substance and selected from the group of silicon or GaAs. Alternative embodiments of arrangements are formed on a layer of silicon dioxide or $Al_xO_y$.

Figure 3:
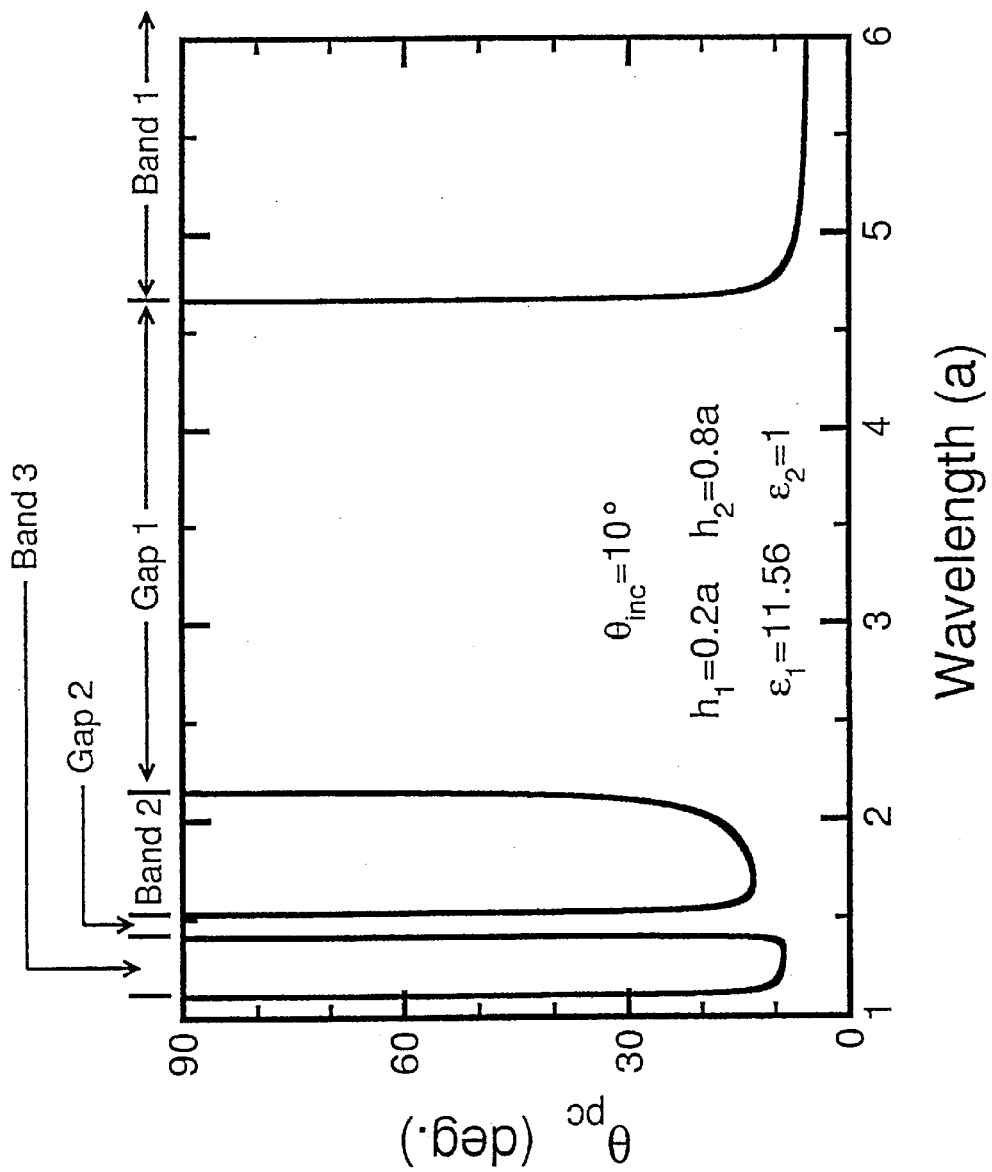
FIG. 3 shows propagation angle inside a one-dimensional photonic crystal slab as a function of incident beam wavelength.

FIG. 3 shows a sample of the results of the analysis discussed above. The calculation was performed for a simple one-dimensional photonic crystal structure, consisting of alternating layers of two materials with different layer thickness ($h_1$ and $h_2$) and relative permittivities $\epsilon_i$ and $\epsilon_2$. FIG. 3 illustrate that in wavelength ranges determined by dimensions $h_1$, $h_2$; indices of refraction $$n_1=\epsilon_1{}^{1/2}$$

and $$n_2=\epsilon_2{}^{1/2}$$

and angle of incidence $\theta_{inc}$, and the angle of refraction $\theta_{pc}$ can vary widely as a function of wavelength outside the photonic band gaps. In the remainder of this work, angles are understood to be measured in the x-y plane of FIG. 2 and measured with respect to the x-axis. All calculations are performed for TE-mode radiation (electric field along the z-axis). Calculations for TM-modes are performed in a similar fashion yielding qualitatively similar results, but are not shown here.

The independent variable, the horizontal axis represents the wavelength in the incident medium. The range extends from 1 to 6, in units of "a," the period or pitch of the one-dimensional photonic crystal. The dependent variable, the vertical axis, represents the angle of refraction in photonic crystal, $\theta_{pc}$, extends from 0 to 90 degrees. A value on the vertical axis is a measure of the angle of refraction, $\theta_{pc}$, or the angle that the light ray makes with respect to the principal axis 28, a normal, as it propagates in the photonic crystal 10. In FIG. 3 we have taken the specific example of $$\epsilon_1=11.56$$

and $$\epsilon_2=1$$

(appropriate for silicon and air, respectively), and $$h_1=0.2a$$

and $$h_2=0.8a$$

(i.e., 20% of each periodic is occupied by the first material, which is silicon in this case).

FIG. 3 shows that the refraction angle $\theta_{pc}$ varies rapidly with wavelength in certain wavelength ranges. The variation shown is much greater than in conventional optical material. For instance, for $$\theta_{inc}=10°,$$

$\theta_{pc}$ varies monotonically from 70° to 20° as the wavelength $\lambda$ changes monotonically from 4.6565a to 4.6798a. Some of the other wavelength ranges for which rapid variations in $\theta_{pc}$ occur are listed in Table 1 below.

Table 1 below shows five ranges in which the respective refraction angle varies very rapidly and monotonically with wavelength. The wavelengths are given in units of the photonic crystal period "a," and angles in degrees. The incident angle for each is 10°.

TABLE 1

|  | Wavelength Range | | Refraction Angle Range | |
| --- | --- | --- | --- | --- |
|  | Starting λ (α) | Ending λ (α) | Starting $\theta_{pc}$ (deg.) | Ending $\theta_{pc}$ (deg.) |
| Range 1 | 4.6565 | 4.6798 | 70 | 20 |
| Range 2 | 2.0257 | 2.1463 | 20 | 70 |
| Range 3 | 1.5267 | 1.5463 | 70 | 20 |
| Range 4 | 1.4048 | 1.4075 | 20 | 70 |
| Range 5 | 1.1078 | 1.1156 | 70 | 20 |

For each of the above wavelength ranges, two rays of light enter the photonic crystal at the same angle of incidence $\theta_{inc}$. As shown, each ray has a slightly different wavelength producing different angles of refraction inside the photonic crystal ($\theta_{pc}$), the "Starting $\theta_{pc}$" and the "Ending $\theta_{pc}$". It can be seen that the relatively small shift in wavelength characterized by the starting and ending column values produce changes in the refraction angle that are substantially different. This is called the superprism ffect or ultra-refraction. Note that in the present configuration ultra-refraction occurs ust outside of the gaps in the spectrum shown in FIG. 3. Electromagnetic waves with wavelengths within the gaps cannot propagate inside the photonic crystal. Rays with wavelengths within the gaps are totally reflected back into the incident medium. The gaps correspond to the gaps in frequency bands (photonic band gaps) where propagation of electromagnetic radiation is forbidden inside the photonic crystal. The photonic band gaps separate the photonic bands, which represent frequency bands where propagation of electromagnetic radiation is allowed in the photonic crystal. In Table 1, Range 1 and Range 2 respectively correspond to electromagnetic radiation with frequency ranges just below and just above the GAP 1 photonic band gap. Ranges 3 and 4 straddle the GAP 2 photonic band gap. Not all of the ultra-refraction ranges are shown because FIG. 3 extends only over the wavelength from 1 a to 6a. In principle, there are an infinite number of photonic band gaps with frequency ranges higher than (or wavelength ranges shorter than) the ones shown in FIG. 3. In other words, there are an infinite number of ultra-refraction ranges with wavelengths shorter than 1a. However, these ultra-refraction wavelength ranges are very closely spaced. For practical applications, use will be restricted to the ultra-refraction ranges surrounding the lowest few photonic band gaps.

In the model computations leading to Table 1 and FIG. 3, the wavelength and the layer widths ($h_1$ and $h_2$) were expressed in units of the one-dimensional photonic crystal period "a " to show that the ultra-refractive wavelength range of interest is adjusted by scaling the layer widths. By way of example, if the range of the wavelengths of interest resides between 1.527 μm and 1.546 μm, as characterized by Range 3, we set a=1 μm (or $h_1$=0.2 μm and $h_2$=0.8 μm).

If, however, we are interested in dispersion light with wavelengths between 3.053 μm and 3.093 μm, we set a=1 μm (or $h_1$=0.4 μm and $h_2$=1.6 μm)

instead. If we are interested in dispersion light in a range of wavelengths beyond 1.5 μm, we have the option of using any of the ultra-refractive wavelength ranges listed in Table 1 by selecting an appropriate value for the photonic crystal period a.

Table 2 lists the values of a for the five wavelength ranges of Table 1, as well of wavelength range in microns for the given the choices of "a" in micrometers. Note that the higher numbered ranges (corresponding to higher photonic band gaps) are associated with larger values of photonic crystal period a, which make them easier to fabricate. However, in general the higher wavelength ranges also tend to be narrower.

Table 2 below tabulates wavelength ranges in (a) and the choice of photonic crystal period a for application to wavelengths extending from 1.53 μm.

TABLE 2

|  | Wavelength Range in α | | | Wavelength Range in μm | |
| --- | --- | --- | --- | --- | --- |
|  | Starting λ (α) | Ending λ (α) | Period α (μm) | Starting λ (μm) | Ending λ (μm) |
| Range 1 | 4.6565 | 4.6798 | 0.3286 | 1.53 | 1.5377 |
| Range 2 | 2.0257 | 2.1463 | 0.7553 | 1.53 | 1.6210 |
| Range 3 | 1.5267 | 1.5463 | 1.0022 | 1.53 | 1.5496 |
| Range 4 | 1.4048 | 1.4075 | 1.0891 | 1.53 | 1.5329 |
| Range 5 | 1.1078 | 1.1156 | 1.3811 | 1.53 | 1.5408 |

Figure 4:
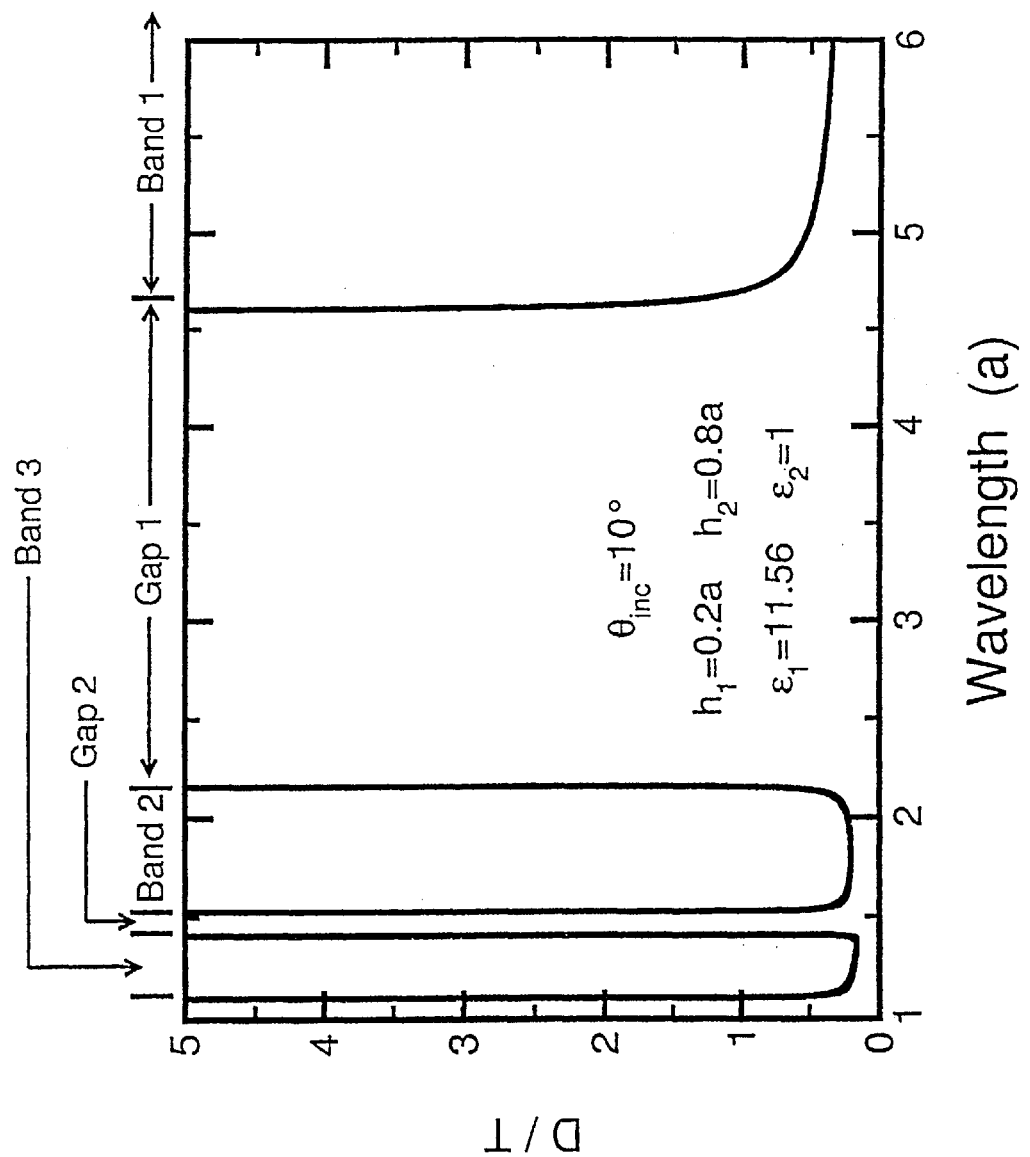
FIG. 4 shows the ratio between lateral displacement (D) and photonic crystal slab thickness (T) as a function of incident wavelength.

FIG. 4 is a graph of the lateral displacement D in units of photonic crystal slab thickness T, i.e., D/T or tan($\theta_{pc}$), as a function of incident wavelength for an incident angle of $\theta_{inc}$=10°. FIG. 2 shows values of D extending in the y-axis direction with T extending in the x-axis direction. We find that the lateral displacement also varies rapidly over narrow wavelength ranges associated with the band edges Oust outside the reflection gaps), in the same way that $\theta_{pc}$ does in FIG. 3. The plot of displacement versus wavelength underscores another feature of using ultra-refraction in this way. As wavelength approaches a gap, the displacerment increases rapidly in a highly non-linear fashion. While this hypersensitivity of displacement to wavelength is precisely the effect we wish to exploit, the use of this effect would also require a high degree of precision in the location of targets such as 27a–27c (e.g., detectors). In addition, we would expect diminished transmission into the photonic crystal as wavelength approaches the gaps where transmission is not allowed. The use anti-reflection coating might be necessary to ensure that we can couple enough light into the photonic crystal to take advantage of ultra-refraction.

For some applications (e.g., spectroscopy), band-edge ultra-refraction characteristics (narrow wavelength range, high non-linearity, and diminished transmission) might not be desirable. In the discussions on the following figures, we will show an implementation that deals effectively with these issues.

FIG. 5 shows a preferred embodiment of a strongly refractive one-dimensional photonic crystal prism 29, made from a photonic crystal 10. The strongly refractive one-dimensional photonic crystal prism 29 of FIG. 5 has a cross section that is illustrated schematically in perspective in the configuration of FIG. 10. As shown in the schematic plan view of FIG. 5, the strongly refractive one-dimensional photonic crystal prism 29 is responsive to a light ray 12 from a light source (not shown), which also has at least two wavelengths. The strongly refractive one-dimensional photonic crystal prism 29 of FIG. 5 also has a one-dimensional periodic layered dielectric structure formed as an array of two or more parallel layers of homogenous optical material.

Figure 9:
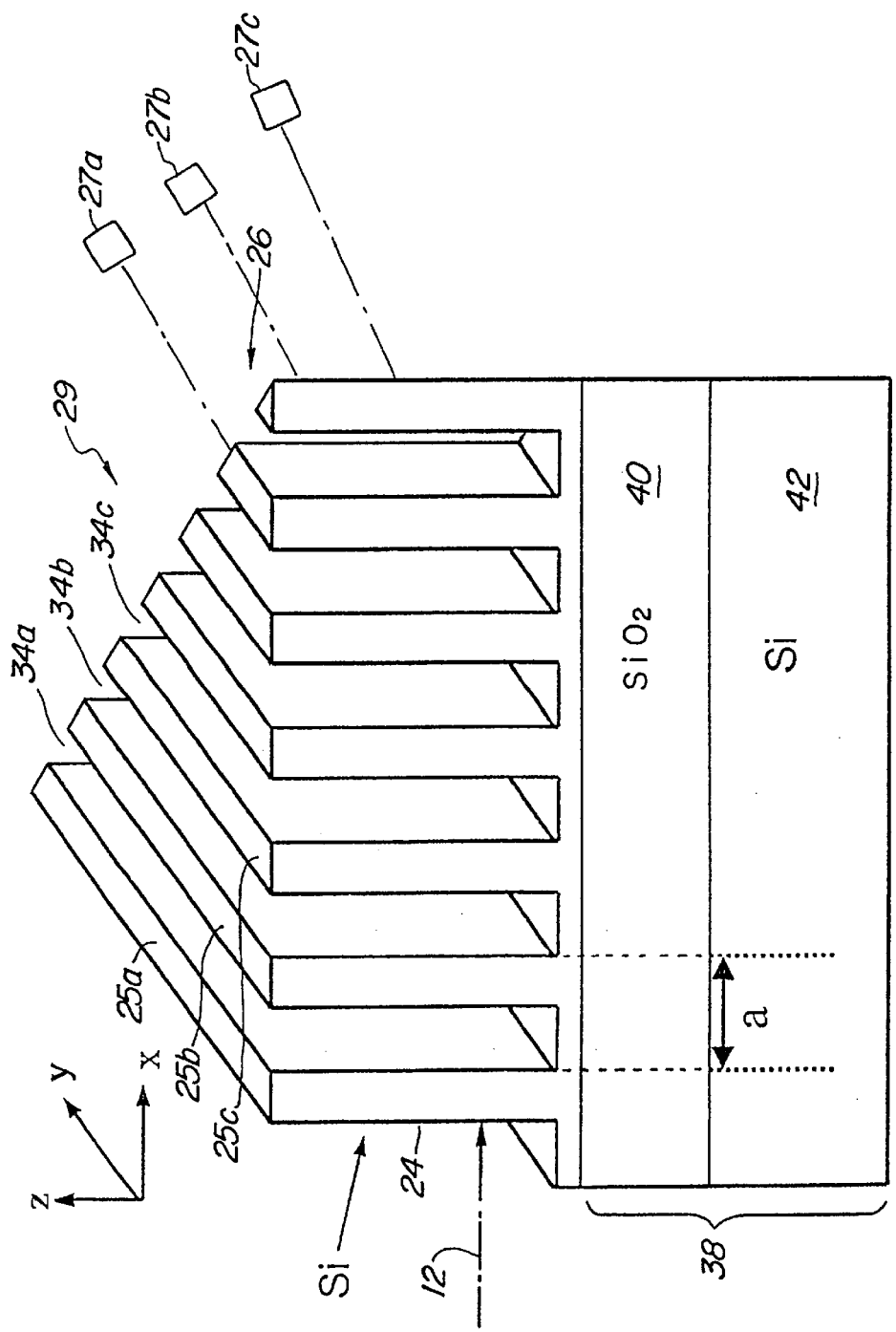
FIG. 9 schematically illustrates a possible implementation of the strongly refractive one-dimensional photonic crystal prism on a SOI (silicon on insulator) wafer using micro-fabrication techniques.
Figure 10:
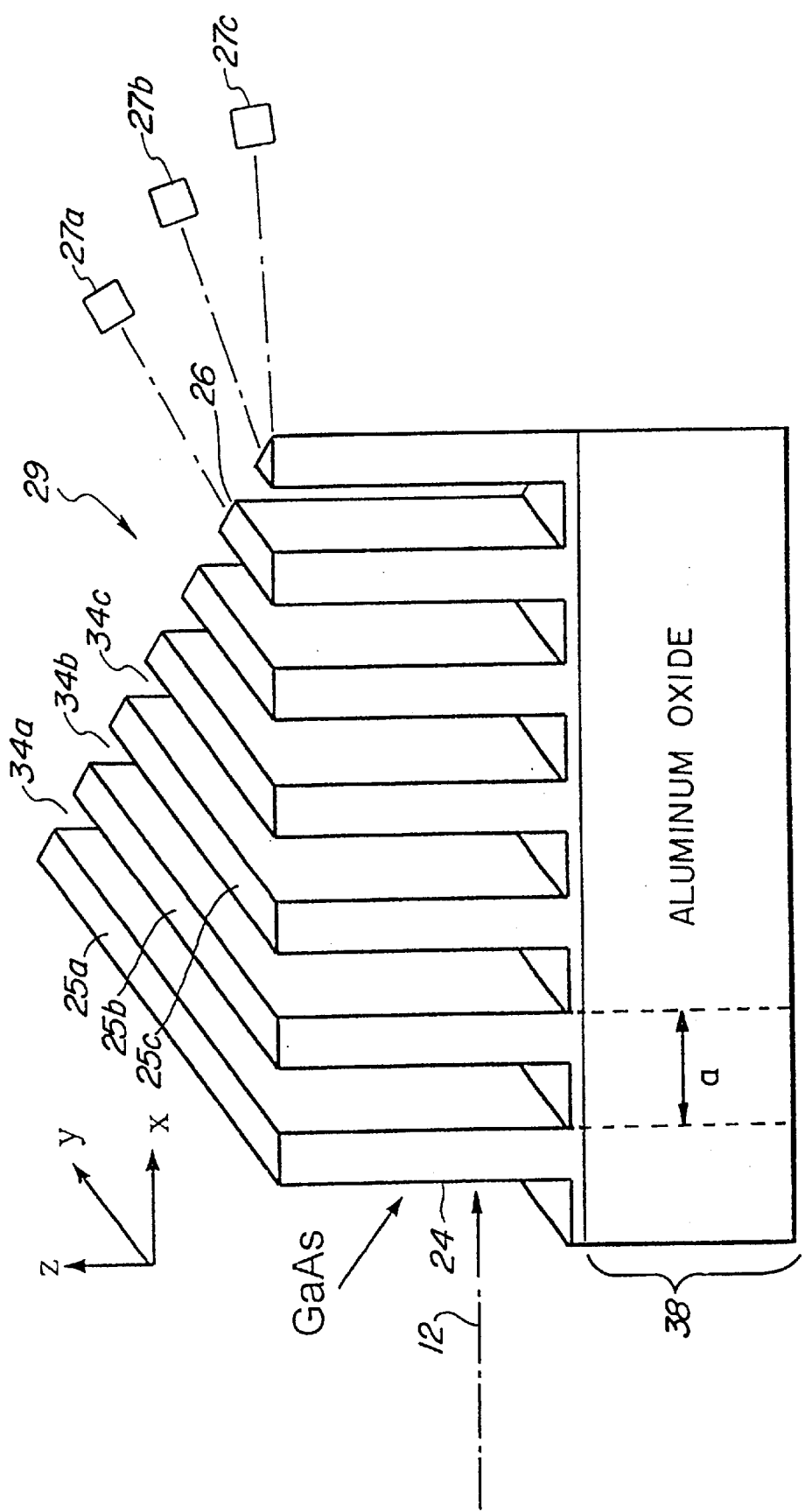
FIG. 10 schematically illustrates a possible implementation of the strongly refractive one-dimensional photonic crystal prism on a GaAs wafer using micro-fabrication techniques.

FIGS. 9 and 10 show that the parallel layers 25a, 25b, 25c . . . etc, of a segment of a strongly refractive one-dimensional photonic crystal prism 29 have a predetermined thickness "a". The structures of FIGS. 9 and 10 schematically show an embodiment in which a light ray will pass through the parallel layers 25a, 25b, 25c, of optical crystal and void spaces 34a, 34b, 34c. Each respective contiguous alternating layer has a different dielectric constant from the next successive layer as in the case of FIG. 9 where the dielectric constant of silicon is different from that of the next void space. FIG. 10 shows the use of GaAs in an alternative embodiment. The one-dimensional periodic layered dielectric structure or strongly refractive one-dimensional photonic crystal prism 29 has an incident surface 24 and an exit surface 26. The incident surface 24 is shown as parallel to the parallel layers 25a, 25b, 25c however, the incident surface may or may not be parallel to the parallel layers as a function of the design. The same is true for the exit surface 26. Referring to FIG. 5, by adjusting the angle $\theta_{xs}$ to a predetermined value, the exit angle $\theta_{out}$ can be arranged to change very rapidly and monotonically with wavelength, except for the normal band gap regions as appear on FIGS. 3 and 4. The exit surface 30 on FIG. 2 is also an example of an exit surface that is not parallel with the parallel layers.

With the exit surface 26 positioned to be non-parallel to the layers 25a, 25b, 25c of the one-dimensional periodic layered dielectric structure, as shown in FIGS. 5, 9 and 10, the light ray 12 enters the incident surface 24, passes through the one-dimensional periodic layered dielectric structure formed by layers 25a, 25b, 25c and void spaces 34a, 34b, and 34c and exits the external exit surface 26 providing a spectrally spread image on a target surface, such as the three rectangular targets 27a, 27b, 27c depicted.

FIG. 9 shows a one-dimensional periodic layered dielectric structure 29 that further comprises a base 38, such as the layer of $SiO_2$ 40 formed on the substrate of silicon 42. The $SiO_2$ operates as an optically confining cladding material. The base layer of $SiO_2$ 40 reduces the amount of evanescent energy lost from the light ray 12 as it passes through the one-dimensional periodic layered dielectric structure 29. In FIG. 10, the base 38 is performed from a layer of Aluminum Oxide which performs the same function as the SiO2 layer 42 shown on FIG. 9.

The homogenous array of FIG. 5 and FIGS. 9 and 10 are formed to have two or more parallel layers 25a, 25b and 25c that repeat as an array. Each layer is formed from an optical material. The first layer 25a has a first dielectric constant that is different from the successive material. The intermediate layer or layers are formed from material having a second dielectric constant or even a third dielectric constant. It might be possible to form the strongly refractive one-dimensional photonic crystal prism 29, as the one-dimensional periodic layered dielectric structure of FIGS. 9 and 10 on a silicon substrate that would be of sufficient size, to permit the formation of additional optical components thereon as discrete components, or additional optical components linked by optical paths, such as waveguides to form integrated optical circuits using the one-dimensional periodic layered dielectric structure.

The one-dimensional periodic layered dielectric structure of FIGS. 5, 9 and 10 can be sized and dimensioned to form a strongly refractive one-dimensional photonic crystal prism 29 that has a number of operating wavelength ranges separated by gaps, such as the gaps shown on FIGS. 3 and 4 for which strong reflection from the incident surface 24 occurs.

FIGS. 5, 9 and 10 shows a photonic crystal 10 having a prism shape. The principal axis 28 of the one-dimensional photonic crystal 10 is along the x-axis. For the purpose of the present discussion, we assume that the normal vector for the front or the incident surface 24 is also along the x-axis, and that the normal vector of the back or angled exit surface 26 is at an angle $\theta_{xs}$ with respect to the x-axis as depicted in FIG. 5. The shape of the prism 29 we have drawn here is triangular. In general the prism 29 could be of other shapes, such as a trapezoid. A ray 12 of polychromatic electromagnetic wave entering from the incident surface at an angle $\theta_{inc}$ would be dispersed in the photonic crystal prism 29, and different wavelength components would exit the angled exit surface at different exit angles ($\theta_{out}$) as depicted in FIG. 5 for wavelengths $\lambda_a$, $\lambda_b$, and $\lambda_c$.

Figure 6:
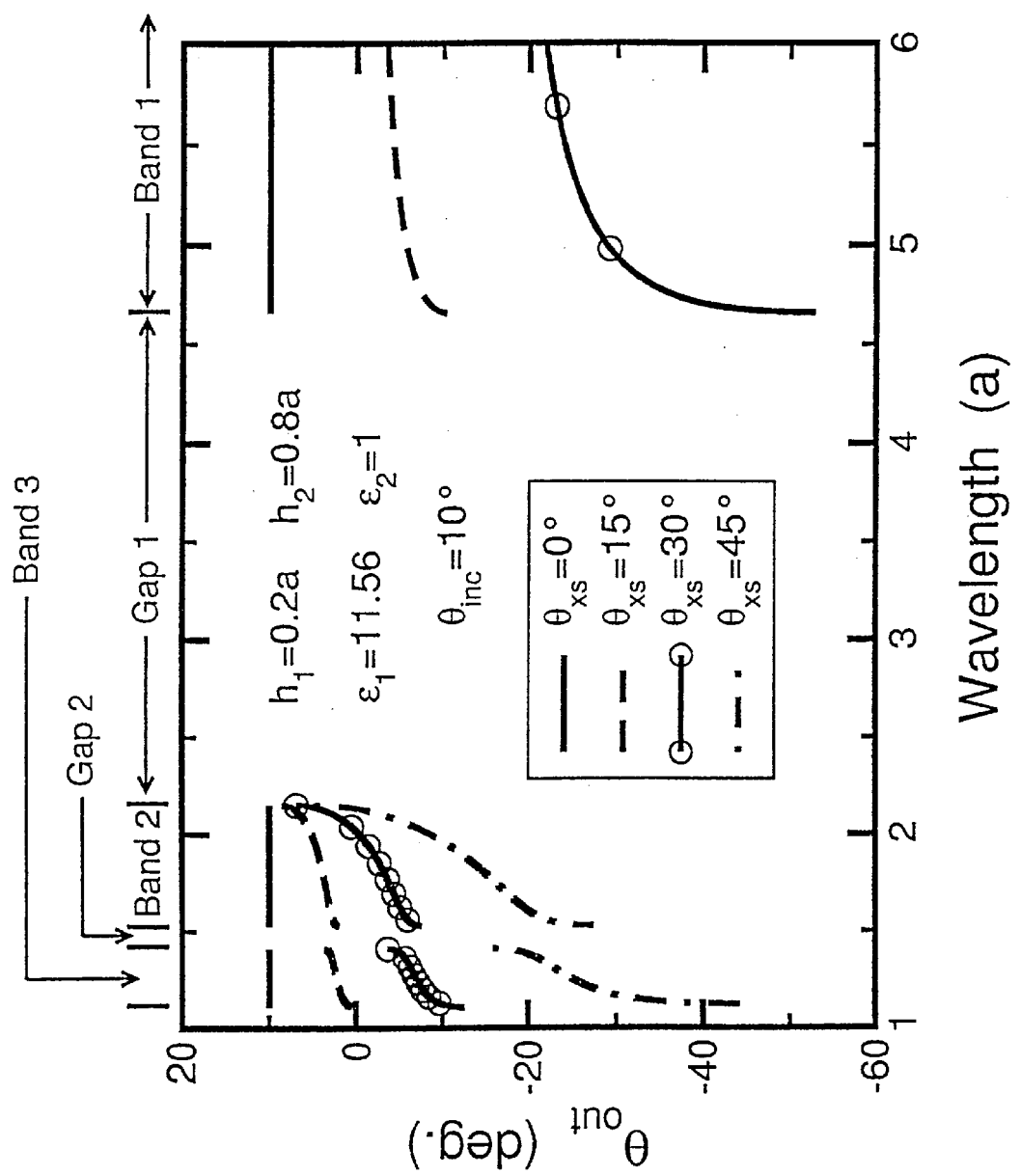
FIG. 6 shows exit beam propagation angle, $\theta_{out}$, as a function of incident wavelength, after traversing the strongly refractive one-dimensional photonic crystal prism. Results for four different exit surface angles, $\theta_{xs}$, are plotted.

FIG. 6 shows the exit beam propagation angle $\theta_{out}$(deg.) as a function of incident wavelength for a set of prisms with four different exit surface orientations, characterized by surface normal angles of:

$\theta_{xs}$=0°, 15°, 30°, and 45 °1

The incidence angle:

$\theta_{inc}$=10° is used for all four cases. On the top side of the graph, we have divided the wavelengths into a number of regions, named Band 1, Band 2, Gap 1 and Gap 2, etc. Band 1 corresponds to the lowest transmission band, i.e., the lowest in frequency or longest in wavelength. Band 2 is the next transmission band in ascending frequency, etc. The transmission bands are separated by gaps, labeled as Gap 1, Gap 2, etc. with the lowest gap (in frequency) being Gap 1. Incident waves with wavelengths in the gaps are reflected at the front surface, and do not propagate inside the photonic crystal.

For a surface normal angle of:

$\theta_{xs}$=0°, the back and front surfaces are parallel, and, as expected, the exit beam propagation angle $\theta_{out}$ is the same as the incident angle for all transmitted wavelengths such that:

$\theta_{out}=\theta_{inc}$=10°

For other values of $\theta_{xs}$, the exit angle Lout exhibit large variations as functions of transmitted wavelength, as we have seen earlier with the angle of propagation in photonic crystal $\theta_{pc}$ and in the lateral displacement D. However, there are some fundamental differences. While the rapid variations in Opc and D occur over narrow wavelength ranges near the band edges, just outside the reflection gaps, the variation in $\theta_{out}$ occur over the full range of allowed wavelength bands. For example, as listed in Table 1, the dispersion in the angle of refraction $\theta_{pc}$ for wavelengths in Range 2, covers λ=2.0257a to λ=2.1463a, and the dispersion in the angle of refraction $\theta_{pc}$ for wavelengths in Range 3, covers λ=1.5267a to λ=1.5463a.

However, using values of surface normal angles of:

$\theta_{xs}$=15°, 30°, and 45°, we obtain a range in dispersion for $\theta_{our}$ which covers both Range 2 and Range 3, plus all the wavelengths in between, giving total coverage from θ=1.5267a to θ=2.1463a for each of the respective $\theta_{xs}$ values used.

FIG. 6 shows that an exit surface normal angle of 30° or 45° allows $\theta_{out}$ to cover the entire second transmission band labeled Band 2 in FIG. 6, while the use of $\theta_{pc}$, cover only the edges of the same band. The dispersion of $\theta_{out}$ in Band 2 is closer to being linear in comparison to that of Band 1 in wavelength, making it more useful than the highly non-linear variation of $\theta_{pc}$. Since the dispersion of $\theta_{out}$ occurs with a transmission band, rather than at the band edges near reflection gaps where transmission amplitudes diminish, we expect that embodiments scheme to be much more efficient.

Note that the strong dispersion in the exit angle $\theta_{out}$ is evident in Band 2 and Band 3 as well as at the edge of Band 1 (which corresponds to longer wavelengths). As shown in Table 2, the use of higher numbered bands permits the use of a larger period (a) to cover the same wavelength range. A larger value of period (a) reduces the demand on fabrication, as larger feature sizes are in general easier to make.

Figure 7:
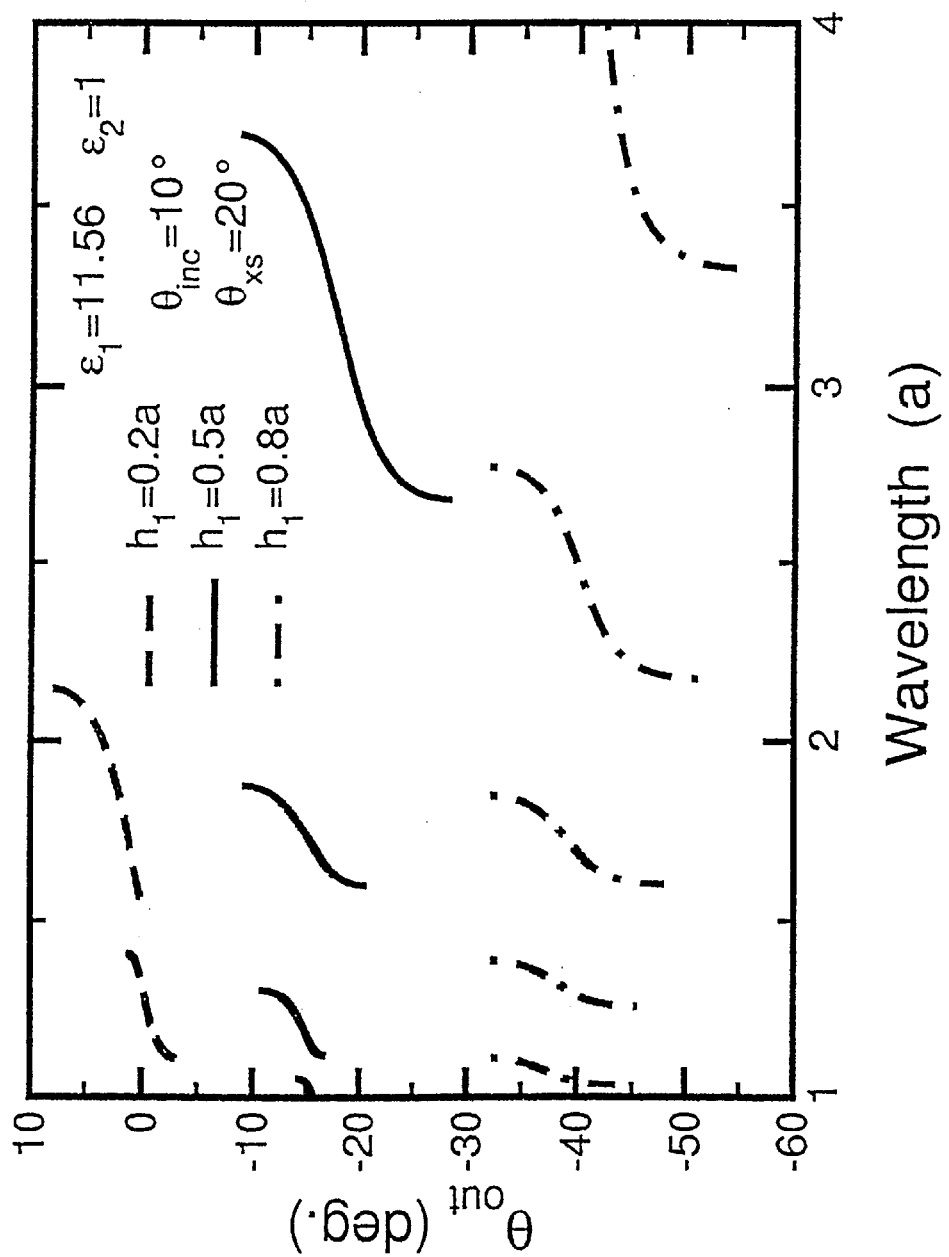
FIG. 7 shows exit beam propagation angle, $\theta_{out}$, as a function of incident wavelength after traversing a strongly refractive one-dimensional photonic crystal prism for three different layer-width combinations.

FIG. 7 shows the exit angle $\theta_{out}$ as a function of wavelength for a set of three structures with different layer widths:

$$h_1=0.2a, h_2=0.8a, \quad (1)$$

in dashed lines, $$h_1=0.5a, h_2=0.5a, \quad (2)$$

in solid lines, and $$h=0.8a, h_2=0.2a, \quad (3)$$

in dash-dot lines. The same angle of incidence of $$\theta_{inc}=10°$$

and exit surface normal angle of $$\theta_{xs}=45°$$

are used for all 3 cases. FIG. 7 therefore provides a method of tuning the ultra-refractive properties of the one-dimensional photonic crystal prismlo by adjusting the ratio of $h_1$ and $h_2$ to a required range of exit angle $\theta_{out}$ for a predetermined range of wavelength (a).

Figure 8:
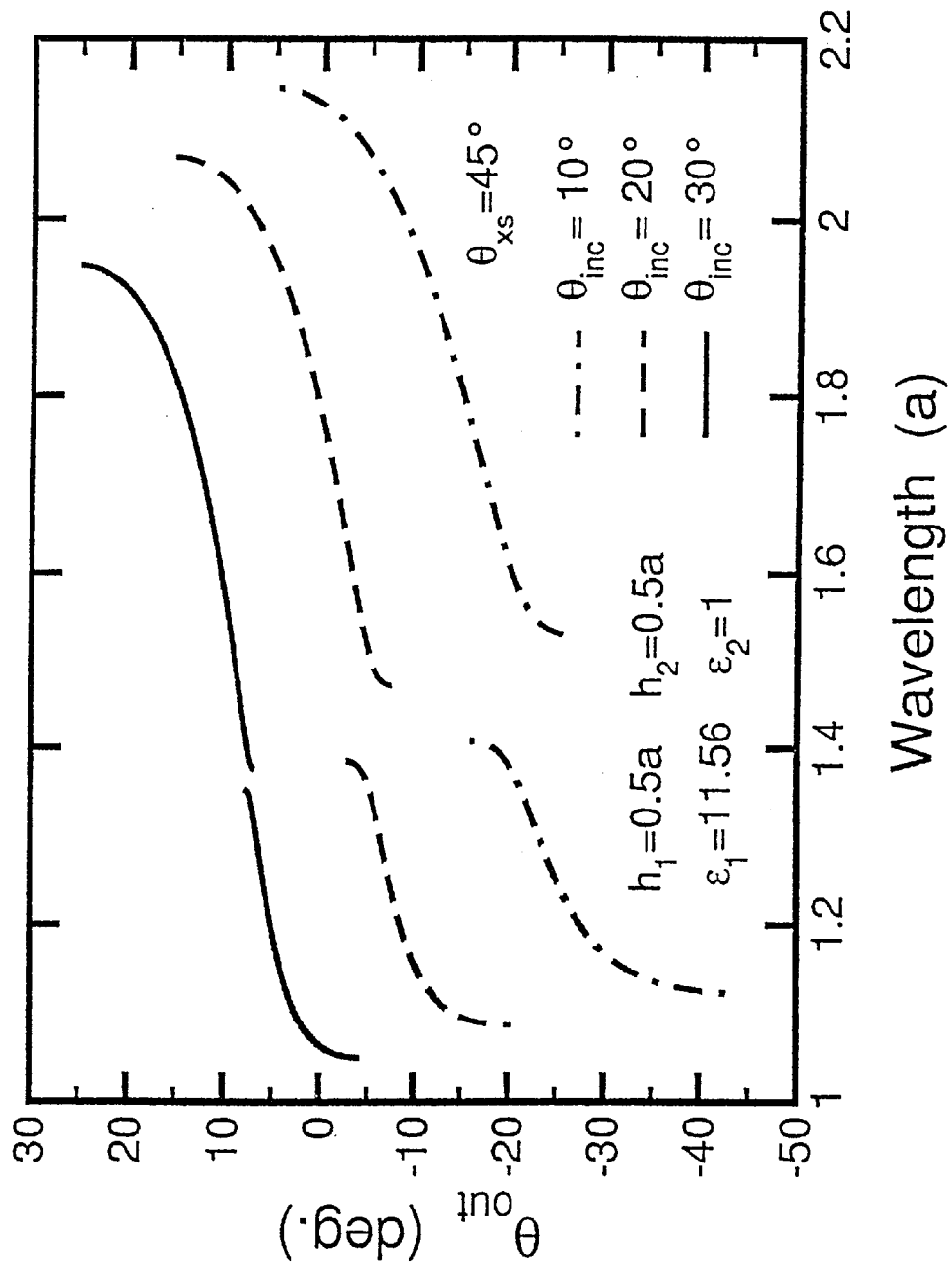
FIG. 8 shows exit beam propagation angle, $\theta_{out}$, as a function of incident wavelength after traversing a strongly refractive one-dimensional photonic crystal prism from three different incidence angles, $\theta_{inc}$.

FIG. 8 shows the exit angle $\theta_{out}$ as a function of wavelength for a structure with:

$$h_1=0.5a, h_2=0.5a,$$

and exit surface angle $$\theta_{xs}=45°.$$

Three different incidence angles of:

$$\theta_{inc}=10°, 20°, \text{ and } 30°$$

are used. FIG. 8 therefore provides another method of tuning the ultra-refractive properties of the strongly refractive one-dimensional photonic crystal prism 29 the $\theta_{out}$ range for a predetermined wavelength and for a family of incidence angles.

The one-dimensional photonic crystal prism 29 might be made in a number of ways. One possibility would be to define a set of equally spaced, vertical, parallel plates using lithographical techniques. FIG. 9 shows how such a structure would appear using a SOI (silicon on insulator) wafer. An article entitled "Two-dimensional Si photonic crystals on oxide using SOI substrate," by A. Shinya et al., published in *Optical and Quantum Electronics,* 34:113–121, in 2002, shows a structure that consists of a silicon dioxide layer sandwiched between silicon layers.

Figure 11:
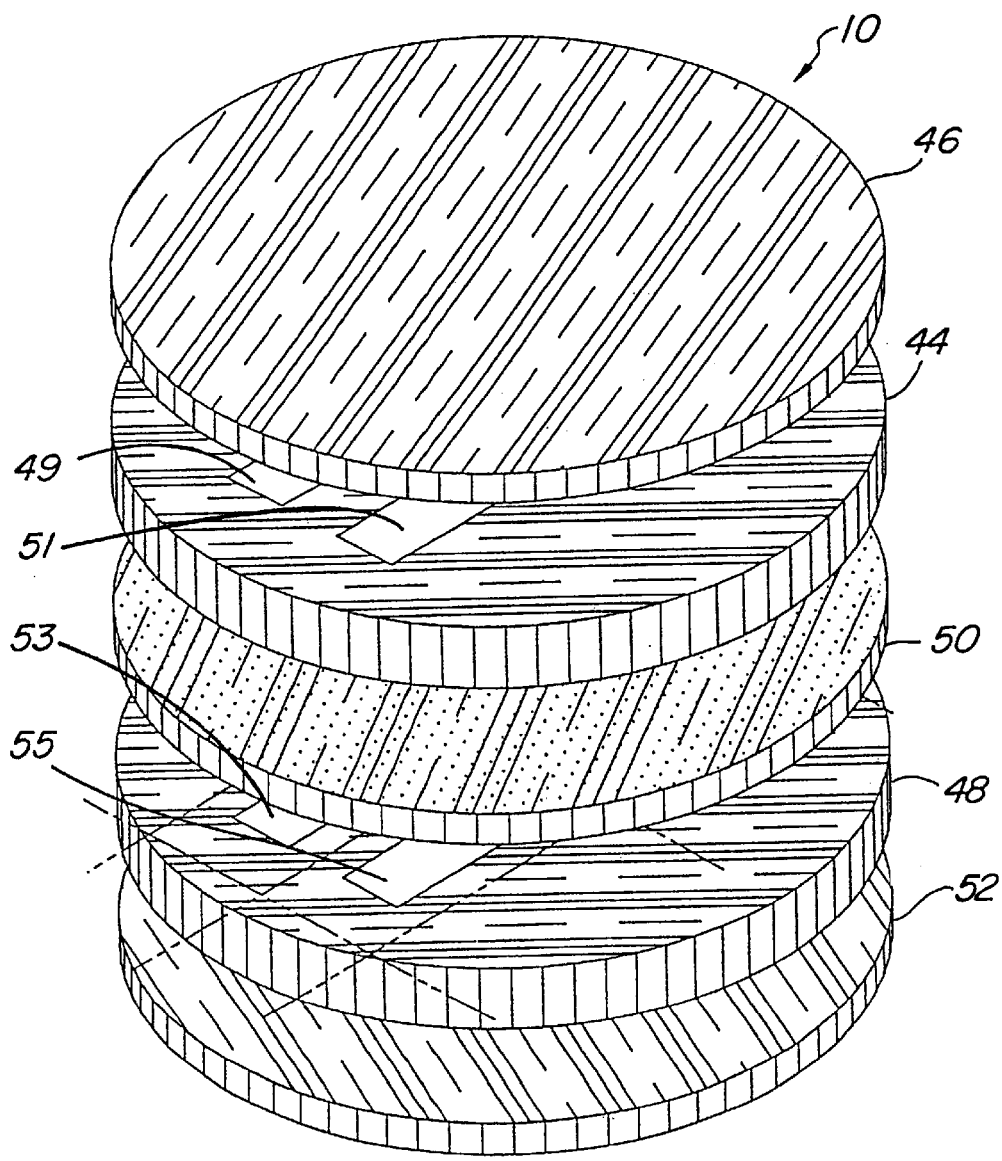
FIG. 11 is a 3-D schematic perspective exploded view of two wafers etched to expose void rectangular regions, the two etched wafers being interleaved between three solid wafers before assembly of the strongly refractive one-dimensional photonic crystal prism.

Referring now to FIG. 11, the strongly refractive one-dimensional photonic crystal prisms are schematically shown formed in a photonic crystal such as that shown as defined in the top silicon layer 44, while the oxide layer 46, having a lower index than silicon, serves as a cladding layer to confine the light to paths in the photonic crystal 10. The one-dimensional photonic crystal structure could also be implemented in GaAs on $Al_xO_y$, in a procedure similar to that described in an article entitled "Three-dimensional control of light in a two dimensional photonic crystal slab," by E. Chow, S. Y. Lin, S. G. Johnson, et al. that appeared in, Nature, 407, 983–986 in year 2000. The parallel plates 25a–25c of the one-dimensional photonic crystal 10 can be lithographically defined in a GaAs layer on top of $Al_{0.9}Ga_{0.1}As$ layer. The $Al_{0.9}Ga_{0.1}As$ layer can then be wet oxidize to make an $Al_xO_y$ layer which has a lower index of refraction than GaAs and acts as a lower cladding layer to confine light in the GaAs photonic crystal. Since all the surfaces in the one-dimensional photonic crystal 10 are parallel, simple anisotropic wet etching can be used in the fabrication process. For instance, KOH (potassium hydroxide) can be used to etch [110]-oriented silicon to produce the parallel-plate one-dimensional photonic crystal structure inexpensively.

Figure 12:
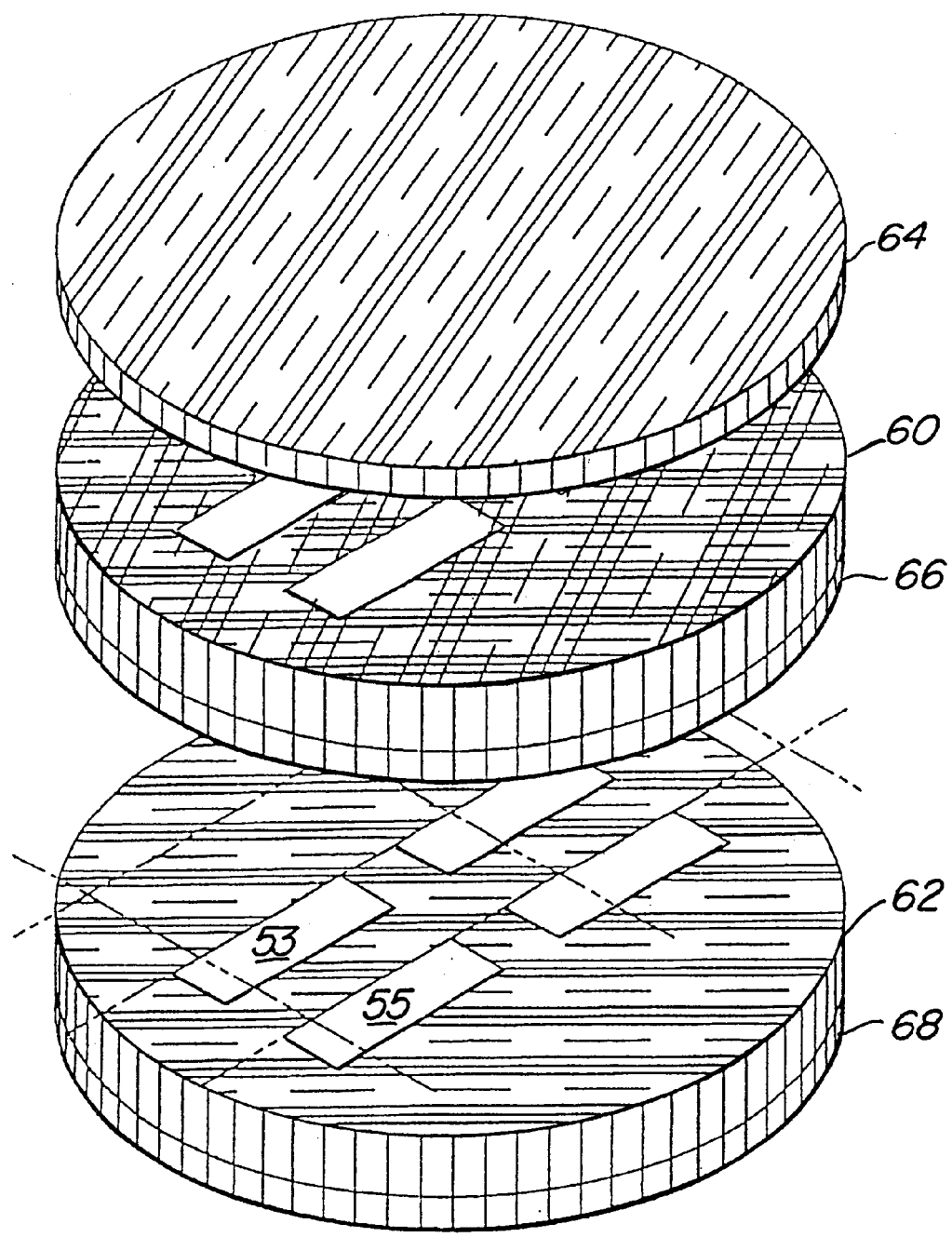
FIG. 12 is a 3-D schematic perspective exploded view of two silicon dioxide coated wafers etched to expose void rectangular regions in the silicon dioxide, the two etched wafers being stacked under a single solid silicon or germanium wafer before assembly of the strongly refractive one-dimensional photonic crystal prism.

FIG. 11 and FIG. 12 allow for the possibility of monolithic integration with other micro optical components on the same wafer, or applications requiring longer wavelengths (such as millimeter waves). One-dimensional photonic crystal prisms could be made by bonding pre-formed wafers 44, 46, together. FIG. 11 and FIG. 12 suggest that a large number of strongly refractive one-dimensional photonic crystal prisms 29 could be could be formed on silicon wafers. One-dimensional photonic crystals, as shown in FIG. 5, could be etched in the wafers in large numbers using a suitable mask (not shown). The structures of FIGS. 11 and 12 are schematic in that they suggest that the channels of alternating index of refraction could be formed in horizontal arrays on a single wafer or possibly in vertical arrays since the stack of wafers might be formed and registered with many layers positioned over each other vertically. If the layers are formed in the plane of a wafer, the incident and exit faces are formed by slicing the wafer as required at appropriate angles.

FIG. 11 shows two round wafer layers 44, 48 of material, possibly silicon, separated by insulator layer 50 and covered by insulator layers 46 and 52, that have been prepared by masking and etching an array of rectangular void spaces 49, 51, 53 and 55 respectively in and through the wafers. It might be possible to punch or form the wafers with the subject void spaces. Ion milling or chemical etching using masks are also possible alternative steps in the preparation of silicon wafers 44, 48 typically having a diameter of three to four inches and which could contain hundreds of void spaces 49, 51, 53 and 55. Once the silicon wafers layers 44, 48 are aligned and stacked they are bonded using a pre deposited gold eutectic between layers 46, 44; 50, 48, 52 or by bonding layers 44, 50, 48 on their edges. Optical cement and other adhesives are possible alternative methods of attachment. Wafer bonding using intermediate $SiO_2$ layers is another possibility.

A second alternative for fabrication of large numbers of the one-dimensional photonic crystal structure is pictured in FIG. 12, which shows a stack of SOI (silicon on insulator) wafers 60, 62 that have been masked and pre-processed to remove the silicon in regions to form rectangular void spaces 53, 55. Cover layer 64 is typically an insulator layer of material such as silicon dioxide. The etch or mill operations stop before the material removed includes the base material of insulator 66, 68, typically silicon dioxide. Once the wafers 60, 62 are aligned and stacked, they are bonded using a pre deposited gold eutectic between layers or on the edges. Optical cement and other adhesives are possible methods of attachment.

After a suitable number of wafers are stacked they are bonded again using the method described above in connection with FIG. 11. The wafers are aligned, or registered and stacked and then bonded using a pre deposited gold eutectic between layers or on the edges as in the case of the assembly of FIG. 11. Optical cement and other adhesives are possible methods of attachment. In the preferred embodiment, silicon is used for the plates and air is used for the gaps between the plates.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the claims.

What is claimed is:

1. A strongly refractive one-dimensional prism, made from a photonic crystal, responsive to a light ray from a light source having at least two wavelengths, comprising:

a one-dimensional periodic layered dielectric structure formed as an array of two or more parallel layers of homogenous optical material, each parallel layer having a predetermined thickness and having a different dielectric constant from a successive layer, the one-dimensional periodic layered dielectric structure having an external incident surface and an external exit surface, the incident surface and, or the exit surface being non-parallel to the layers of the one-dimensional periodic layered dielectric structure, the light ray entering the incident surface, passing through the one-dimensional periodic layered dielectric structure and exiting the external exit surface; thereby providing a spectrally spread image on a target surface.

2. The strongly refractive one-dimensional prism of claim 1 wherein the one-dimensional periodic layered dielectric structure further comprises a base formed from an optically confining cladding material, the base being characterized to reduce the amount of evanescent energy lost from the light ray passing through the one-dimensional periodic layered dielectric structure, wherein the homogenous array of two or more parallel layers is formed from an optical material having a first dielectric constant and the intermediate layer is formed material having a second dielectric constant, and whereby the one-dimensional periodic layered dielectric structure is sized and dimensioned to provide a strongly refractive one-dimensional prism having a number of operating wavelength ranges separated by gaps for which strong reflection from the incident surface occurs.

3. The strongly refractive one-dimensional prismn of claim 1 wherein the one-dimensional periodic layered dielectric structure further comprises:

a base formed from an optically confining cladding material, the base being characterized to reduce the amount of evanescent energy lost from the light ray passing through the one-dimnensional periodic layered dielectric structure, wherein the number of, and period of, periodic layers are sized and dimensioned to provide a strongly refractive one-dimensional prism having a number of operating wavelength ranges separated by gaps for which strong reflection from the incident surface occurs, and whereby the strongly refractive one-dimensional prism exhibits substantial angular dispersion over the entirety of each of the operating wavelength ranges.

4. The strongly refractive one-dimensional prism of claim 1 wherein:

the homogenous array of two or more parallel layers is formed from an optical material having a first dielectric constant and the intermediate layer is formed from a dielectric material having a second dielectric constant, wherein the target surface comprises at least a first detector and a second detector, each detector being spaced apart and positioned to be responsive to a respective portion of the spectrally spread image, and wherein the strongly refractive one-dimensional prism exhibits substantial angular dispersion over the entirety of each of the operating wavelength ranges in response to the exit surface being non-parallel to the layers of the one-dimensional periodic layered dielectric structure and whereby the one-dimensional periodic layered dielectric structure is sized and dimensioned to provide a strongly refractive one-dimensional prism having a number of operating wavelength ranges separated by gaps for which strong reflection from the incident surface occurs.

5. The strongly refractive one-dimnensional prism of claim 1 wherein:

the homogenous array of two or more parallel layers is formed from an optical material having a first dielectric constant and the intermediate layer is formed as void spaces between the parallel layers.

6. The strongly refractive one-dimensional prism of claim 1 wherein the one-dimensional periodic layered dielectric structure formed as a homogenous array of two or more parallel layers is formed from a semiconductor material, selected from a group consisting of silicon, germanium, or gallium arsenide.

7. The strongly refractive one-dimnensional prism of claim 1 wherein the one-dimensional periodic layered dielectric structure formed as a homogenous array of two or more parallel layers is formed by stacking and bonding wafers of dielectric substances or wafers containing partially removed sections to form void spaces; the bonded stack is cut along predetermined lines to form a plurality of strongly refractive one-dimensional prisms.

8. The strongly refractive one-dimnensional prism of claim 4 wherein at least the first detector and a second detector, are formed in or on the external exit surface of the one-dimensional periodic layered dielectric structure formed as a homogenous array of two or more parallel layers.

9. A strongly refractive one-dimensional prism, responsive to a light ray from a light source, the ray of light intercepting an incident surface on the strongly refractive one-dimensional prism, the strongly refractive one-dimensional prism comprising:

a first vertically stacked parallel array of layers formed from a substantially transparent material having a predetermined thickniess and having a first index of refraction, the layers being ispaced apart at predetermined distances from each other, and a second array of layers interleaved into the spaces between the first vertically stacked parallel array of layers, each interleaved layer having a second index of refraction, the light ray passing through the first and second vertically stacked and interleaved arrays of layers to exit an exit surface and provide a spectrally spread image on a target surface.

10. The strongly refractive one-dimensional prism of claim 9 wherein the target comprises at least a first detector and a second detector, each detector being spaced apart and positioned to be responsive to a respective portion of the spectrally spread image.

11. The strongly refractive one-dimensional prism of claim 9 wherein the second array of layers is formed as an array of void spaces.

12. The strongly refractive one-dimensional prism of claim 9 wherein:

the light ray enters the first and second vertically stacked arrays through the incident surface, the light ray propagating through the first and second arrays and exiting through an angled exit surface, the light ray meeting the incident surface at an angle of incidence, the angled exit surface having a exit surface normal angle $\theta_{xs}$ measured with respect to a principal axis, the exit surface normal angle being greater than zero.

13. The strongly refractive one-dimensional prism of claim 9 wherein the first vertically stacked parallel array of layers is selected from the group including silicon or germanium and the second vertically stacked parallel array of layers are spaces filled with air.

14. The strongly refractive one-dimensional prism of claim 9 wherein the first vertically stacked parallel array of layers and the second array of layers interleaved into the spaces between the first vertically stacked parallel array of layers form a plurality of parallel layer pairs, each parallel layer pair having a layer of first index material of predetermined thickness positioned above a layer of second index material or void space, each parallel layer pair being formed from a wafer having a layer of silicon dioxide on silicon, the silicon dioxide layer being etched to form void spaces by applying a mask to the silicon dioxide surface and using photo lithographic techniques to remove selected regions of the silicon dioxide leaving a pattern of void spaces, a plurality of masked and etched wafers being staked, bonded and cut along predetermined lines to form a plurality of superprisms.

15. The strongly refractive one-dimensional prism of claim 10 wherein at least the first detector and a second detector, are formed in or on an outermost layer of the first vertically stacked parallel array of layers at predetermined positions.

16. A strongly refractive one-dimensional prism, responsive to a light ray from a light source having at least two wavelengths comprising:

a parallel array of dielectric plates, each respective dielectric plate having parallel sides, the dielectric plates being periodically spaced, and extending normally and homogeneously from at least one substrate, the array having at least an incident face and an exit surface normal to the substrate, the light source being coupled to the incident face, the light ray passing from the incident face through the parallel array of dielectric plates to exit the exit surface and provide a spectrally spread image on a target surface.

17. The strongly refractive one-dimensional prism, of claim 16 wherein the dielectric plates and substrate material is homogenous and selected from the group of silicon or GaAs.

18. The strongly refractive one-dimensional prism, of claim 17 wherein the substrate material is formed on a layer of silicon dioxide or $Al_xO_y$.

19. The strongly refractive one-dimensional prism, of claim 16 wherein the periodically spaced dielectric plates are separated by a region filled with a dielectric medium selected from the group including a void space, silicon dioxide or air.

20. A strongly refractive one-dimensional prism, responsive to a ray of broadband light from a light source, the strongly refractive one-dimensional prism comprising:

a top layer formed from a substantially transparent optical material having a first index of refraction, the top layer having an outer and an inner surface and a uniform predetermined thickness, the ray of broadband light intercepting the top surface at a predetermined angle of incidence, a bottom layer formed from an optically transparent material having a first index of refraction, the bottom layer having an outer and an inner surface and a uniform predetermined thickness, the light ray enters the strongly refractive one-dimensional prism through an incident surface, the light ray propagating through a first array and a second array and exiting through an angled exit surface, the liglht ray meeting the incident surface at an angle of incidence measured with respect to a principal axis, the angled exit surface having an exit surface normal angle $\theta_{xs}$ measured with respect to the principal axis, the exit surface normal angle being greater than zero, and at least one interrnediate layer being formed from an optically transparent material having a first index of refraction and having a top and bottom surface and a predetermined uniform thickness, the intermediate layer top surface being positioned to form a first space of uniform thickness between the bottom surface of the top layer and the top surface of the intermediate layer, the intermediate layer bottom surface being positioned to form a second space of uniform thickness between the top surface of the bottom layer and the bottom surface of the intermediate layer, the light beam passing through the top layer, the first space, the intennediate layer, the second space and the bottom layer to exit the bottom surface, the light ray forming a substantially elliptical cone having an angle of divergence and a spectral spread along a line of passage leaving the bottom surface of each bottom layer, the size of the spectral spread being elongated further as the ray exits each successive layer, the spectral spread exiting the bottom layer's outer surface and being imaged on a target surface.

21. The strongly refractive one-dimensional prism of claim 20 wherein the target surface comprises at least a first detector and a second detector, each detector being spaced apart and positioned to be responsive to a respective portion of the spectral spread, each detector being formed on or in the bottom surface of the bottom layer.

* * * * *